United States Patent [19]

Terashi

[11] Patent Number: 4,649,431
[45] Date of Patent: Mar. 10, 1987

[54] VIDEO CAMERA IRIS CONTROL CIRCUIT

[75] Inventor: Hiroto Terashi, Tokyo, Japan

[73] Assignee: Asahi Kogaku Kogyo Kabushiki Kaisha, Tokyo, Japan

[21] Appl. No.: 516,491

[22] Filed: Jul. 25, 1983

[30] Foreign Application Priority Data

Jul. 24, 1982 [JP] Japan ................................. 57-128327

[51] Int. Cl.[4] ............................................. H04N 5/235
[52] U.S. Cl. ..................................... 358/228; 354/451; 352/141
[58] Field of Search ............... 358/228, 220, 161, 168; 354/451, 452; 352/141; 318/678

[56] References Cited

U.S. PATENT DOCUMENTS

| | | | |
|---|---|---|---|
| 3,896,461 | 7/1975 | Higuma | 354/451 |
| 4,134,653 | 1/1979 | Ishiguro et al. | 354/451 |
| 4,141,043 | 2/1979 | Liu | 358/228 |
| 4,184,757 | 1/1980 | Kondo | 352/141 X |
| 4,399,466 | 8/1983 | Stephenson | 358/228 |
| 4,410,915 | 10/1983 | Yamamoto | 358/228 |
| 4,471,383 | 9/1984 | Shiono | 358/228 |
| 4,473,843 | 9/1984 | Bishop | 358/228 |
| 4,558,368 | 12/1985 | Aoki et al. | 352/141 X |

Primary Examiner—James J. Groody
Assistant Examiner—E. Anne Toth
Attorney, Agent, or Firm—Sughrue, Mion, Zinn, Macpeak, and Seas

[57] ABSTRACT

An iris control circuit for a video camera in which only a single drive coil is employed so that the video camera employing the circuit can be more easily miniaturized. A first operational amplifier supplies drive current to a drive coil in proportion to the sum of an iris control signal and a feedback signal. A detecting circuit, preferably implemented as a voltage divider circuit, detects the counterelectromotive force developed across the drive coil. A feedback circuit, which may be implemented with a second operational amplifier, develops the feedback signal. The feedback signal can be made variable to adjust the feedback ratio, and hence the proportional braking force applied to the iris.

9 Claims, 3 Drawing Figures

4,649,431

VIDEO CAMERA IRIS CONTROL CIRCUIT

BACKGROUND OF THE INVENTION

The present invention relates to an iris control circuit for a video camera.

In a video camera, the exposure setting must be correct at all times in order to correctly reproduce a wide variety of scenes with high fidelity. In order to meet this requirement, recent video cameras have been provided with a so-called "automatic iris mechanism" which automatically controls the degree of opening of video camera iris to hence determine the exposure setting.

An example of a control circuit used in a conventional automatic iris mechanism of this type is shown in FIG. 1. In this circuit, an iris control signal, which may, for instance, be derived from a luminance signal component of a composite video signal, is applied to the input terminal P. In response thereto, a drive coil $L_1$ connected to the output terminal of an operational amplifier $A_0$ drives a video camera iris (not shown). In order to smoothly drive the iris, a brake coil $L_2$ is provided which is wound on the core (not shown) of the drive coil $L_1$. The brake coil $L_2$ is connected to an input terminal of the operational amplifier $A_0$. With this arrangement, the core operates in association with the driving of the iris in such a manner that a brake torque is applied to the iris which varies according to the driving speed of the iris.

The conventional circuit, because it requires both a drive coil and a brake coil, takes up a relatively large amount of mounting space. Accordingly, the lens mounting structure where the iris is positioned is necessarily large, which makes it difficult to miniaturize the video camera.

As described above, the coils $L_1$ and $L_2$ are mounted on a common core. In general, the core should be a flat, plate-shaped core which is rotatably supported, and the driving coil $L_1$ and the braking coil $L_2$ are wound on opposite end portions of the core. The resulting structure is a movable-magnet type structure in which the outputs of the coils $L_1$ and $L_2$ are nonlinear with respect to the movemet of the core. Accordingly, when it is attempted to perform all the various necessary control operations of the servo system utilizing the outputs of the coils $L_1$ and $L_2$, various difficulties occur, with the result that the manufacturing cost is accordingly increased.

In view of the foregoing, an object of the invention is to provide a video camera iris control circuit which is so designed that a video camera can be easily miniaturized and in which the output of an iris driving coil has a linear characteristic.

SUMMARY OF THE INVENTION

In accordance with this and other objects of the invention, there is provided an iris control circuit for a video camera including a single drive coil which drives the iris of the video camera in response to an iris control signal, detecting circuit means for detecting a counterelectromotive force across said drive coil, and feedback circuit means for negatively feeding back an output of the detecting circuit to the drive coil.

Preferably, a first operational amplifier is employed for summing the iris control signal and the feedback signal and for providing drive current to the drive coil. The detecting circuit means may be implemented with a voltage divider circuit connected across the drive coil and a series resistor of the drive coil circuit. The feedback circuit means may be implemented with a second operational amplifier which receives the voltage at the dividing point of the voltage divider circuit, which voltage is representative of the counterelectromotive force across the drive coil, and a variable resistor connected between the output of the second operational amplifier and the noninverting input terminal of the first operational amplifier, to which the iris control signal is also applied.

DESCRIPTION OF THE PREFERRED EMBODIMENTS

Figure 1:
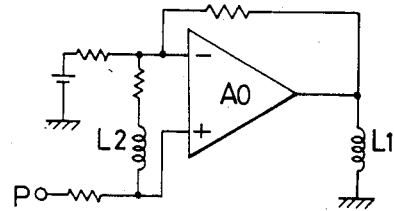
FIG. 1 is a circuit diagram of a conventional video camera iris control circuit.
Figure 2:
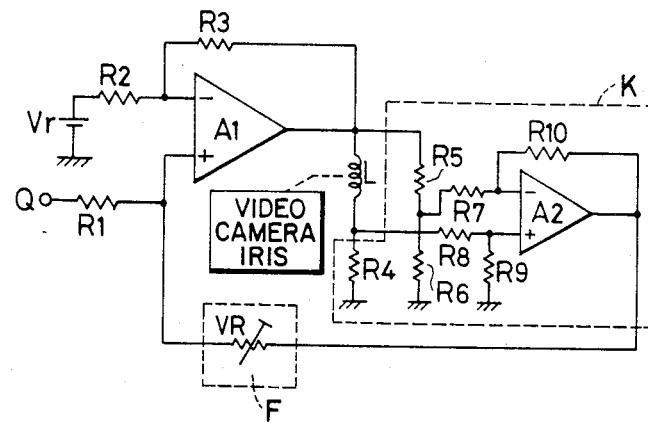
FIG. 2 is a circuit diagram of an example of an iris control circuit according to the invention.

FIG. 2 is a circuit diagram of a preferred embodiment of an iris control circuit of the invention. In FIG. 2, reference character Q designates an input terminal to which an iris control signal is applied. The input terminal Q is connected through a resistor $R_1$ to the noninverting input terminal of an operational amplifier $A_1$, the inverting input terminal of which is grounded through a resistor $R_2$ and a reference voltage source $V_r$. The output terminal of the amplifier $A_1$ is connected through a resistor $R_3$ to its inverting input terminal and is grounded through a drive coil L, which drives the iris, and further through a resistor $R_4$. The output terminal of the amplifier $A_1$ is connected to one end terminal of a series circuit of voltage dividing resistors $R_5$ and $R_6$, the other end terminal of which is grounded. The voltage dividing point of the voltage dividing resistors $R_5$ and $R_6$ is connected through a resistor $R_7$ to the inverting input terminal of a second operational amplifier $A_2$, the noninverting input terminal of which is connected through a resistor $R_8$ to the connection point of the drive coil L and the resistor $R_4$. Further, the noninverting input terminal of the amplifier $A_2$ is grounded through a resistor $R_9$. The inverting input terminal of the amplifier $A_2$ is connected through a resistor $R_{10}$ to the output terminal of the amplifier $A_2$. In this circuit arrangement, the operational amplifier $A_2$ and its related components form a detecting circuit K for detecting the counterelectromotive force of the drive coil L. The output terminal of the amplifier $A_2$ is connected to the noninverting input terminal of the amplifier $A_1$ through a variable resistor VR which forms a feedback circuit F and is used to adjust the feedback ratio of the circuit.

In the circuit of the invention, only a single drive coil is needed for the driving of the iris. Because of this, the iris driving structure of which the drive coil forms a part may be a so-called "moving-coil" type structure in which the drive coil L is rotatably arranged in a uniform magnetic field.

In the circuit construction described above, the iris control signal applied to the input terminal Q is compared with the potential of the reference voltage source $V_r$ by the operational amplifier $A_1$. The drive coil L is energized in proportion to the magnitude of the iris control signal and the iris is driven according to the magnitude of the energization of the drive coil. In this operation, a counterelectromotive force (voltage) is generated in the drive coil L in proportion to the iris driving speed. The magnitude of this force is detected by the detecting circuit K, and the output of the operational amplifier $A_2$ in the circuit K is negatively fed back to the noninverting input of the operational amplifier $A_1$ through the feedback circuit F. That is, in this case, the detection signal corresponding to the counterelectromotive force is opposite in phase to the iris control signal. Hence, the iris driving speed is controlled to be constant, which is equivalent to braking the driving of the iris.

The magnitude of braking against the driving of the iris can be controlled by operating the variable resistor VR in the feedback circuit F, that is, by adjusting the feedback ratio of the circuit. More specifically, as the resistance of the variable resistor VR is increased, the braking force is decreased, thus allowing the iris to respond at a higher speed. Conversely, as the resistance of the variable resistor VR is decreased, the braking force is increased. The iris may in fact be locked by appropriately setting the variable resistor VR.

Figure 3:
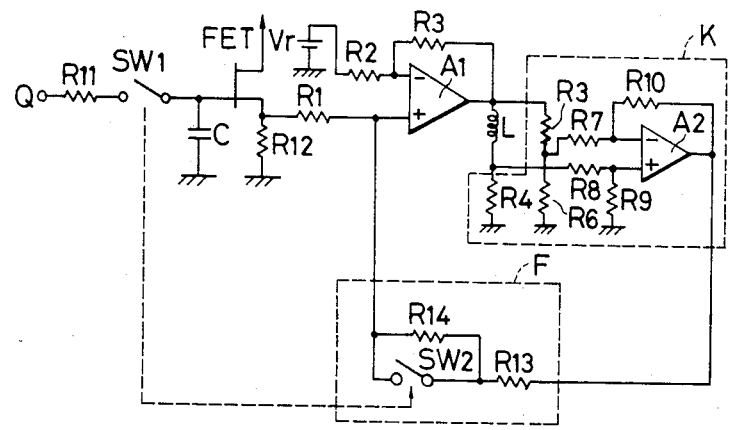
FIG. 3 is a circuit diagram of another example of an iris control circuit of the invention in which an independent locking feature is provided.

FIG. 3 shows another preferred embodiment of the invention which has an independent locking function which may be used to place the iris in a completely locked state. In this embodiment, the input terminal Q is connected to one terminal of a resistor $R_{11}$, the other terminal of which is connected through a normally closed switch $SW_1$ to the charging terminal of a capacitor C, the other terminal of which is grounded. The connection point of the capacitor C and the switch $SW_1$ is connected to the gate of a fieldeffect transistor FET, the source of which is grounded through a resistor $R_{12}$ and connected to one terminal of a resistor $R_1$. The switch $SW_1$ operates in association with a normally open switch $SW_2$. One terminal of the switch $SW_2$ is connected to the noninverting input terminal of an operational amplifier $A_1$, and the other terminal is connected through a resistor $R_{13}$ to the output terminal of an amplifier $A_2$. A resistor $R_{14}$ is connected in parallel with the switch $SW_2$. The resistors $R_{13}$ and $R_{14}$ form a feedback circuit F. The remainder of the circuit arrangement is similar to that of FIG. 2.

In an ordinary photographing operation, the switch SW is closed while the switch $SW_2$ is open. The iris driving speed is then controlled using a feedback ratio determined by the resistances $R_{13}$ and $R_{14}$; that is, a small braking force is produced. On the other hand, for a photographing operation in which the iris should be locked, the switch $SW_1$ is opened and the switch $SW_2$ is closed, whereby the iris signal at the time of locking is held by the field-effect transistor FET, and the feedback ratio which determines iris driving speed and which is determined by the resistance $R_{13}$ is increased. As a result, the drive current of the drive coil L is cancelled, thus stopping the driving of the iris; that is, the servo system coupled to the iris is locked.

As is apparent from the above description, the brake coil in the conventional iris driving system is eliminated with the use of the invention. Therefore, the size of the lens mounting structure where the iris is positioned can be reduced, and accordingly the video camera itself miniaturized. Since the brake coil is eliminated, the iris driving structure may be of the moving-coil type, and accordingly the output of the drive coil is made linear, whereby various servo systems can be readily controlled. Since the iris control circuit has been simplified in construction according to the invention, the manufacturing cost thereof is reduced over the prior art.

I claim:

1. An iris control circuit for a video camera, comprising;
    drive coil means including a drive coil for driving the iris of a video camera;
    means for inputting an iris control signal to said drive coil means;
    detecting circuit means for detecting a counterelectromotive force produced in said drive coil;
    feedback circuit means for generating a feedback signal in response to an output of said detecting circuit means, said feedback signal being applied to said drive coil means;
    said drive coil means further comprising means for controlling the flow of current through said drive coil in response to at least one of said iris control signal and said feedback signal.

2. The iris control circuit of claim 1, wherein said detecting circuit means comprises a voltage divider circuit having a first end terminal connected to a first terminal of said drive coil and a second end terminal connected to a reference terminal.

3. The iris control circuit of claim 1, said drive coil means comprising an operational amplifier for supplying drive current to said drive coil in response to both said iris control signal and said feedback signal.

4. The iris control circuit of claim 3, wherein said feedback circuit means comprises a variable resistor for variably adjusting a feedback ratio of said iris control circuit.

5. The iris control circuit of claim 4, wherein said detecting circuit means further comprises a second operational amplifier having inputs respectively coupled to said voltage divider circuit and to a second terminal of said drive coil, and an output coupled through said variable resistor to an input of said first-mentioned operational amplifier.

6. An iris control circuit for a video camera comprising:
    a first operational amplifier, first and second resistors, and a reference voltage source, an inverting input terminal of said first operational amplifier being coupled through said first resistor and said reference voltage source to a ground terminal, and a noninverting input of said first operational amplifier being coupled through said second resistor to a source of an iris control signal;
    a drive coil for driving the iris of said video camera and a third resistor, said third resistor having one terminal coupled to said ground terminal and a second terminal coupled through said drive coil to an output of said first operational amplifier;
    fourth and fifth resistors connected in series with one another, the series connection of said fourth and fifth resistors having one end terminal coupled to said ground terminal and the other end terminal coupled to said output of said first operational amplifier;
    a second operational amplifier and sixth through eighth resistors, an inverting input terminal of said second operational amplifier being coupled through said sixth resistor to a connection point of said fourth and fifth resistors, a noninverting input terminal of said second operational amplifier being coupled through said seventh resistor to a connection point of said drive coil and said third resistor, and said eighth resistor being coupled between said noninverting input terminal of said second operational amplifier and said ground terminal; and a variable resistor coupled between an output of said second operational amplifier and said noninverting input terminal of said first operational amplifier.

7. The iris control circuit of claim 6, further comprising a ninth resistor coupled between said output of said first operational amplifier and said inverting input terminal of said first operational amplifier, and a tenth resistor coupled between said output of said second operational amplifier and said inverting input terminal of said second operational amplifier.

8. An iris control circuit for a video camera, comprising:
   a first resistor, a first terminal of said first resistor being coupled to a source of an iris control signal;
   a first switch having a first terminal coupled to a second terminal of said first resistor;
   a capacitor coupled between a second terminal of said first switch and a ground terminal;
   a field effect transistor having a gate coupled to said second terminal of said first switch and a drain connected to a power source terminal;
   a second resistor coupled between a source of said field effect transistor and said ground terminal;
   a first operational amplifier;
   a third resistor coupled between said source of said field effect transistor and a noninverting input terminal of said first operational amplifier;
   a fourth resistor and a reference voltage source, an inverting input terminal of said first operational amplifier being coupled through said fourth resistor and said reference voltage source to said ground terminal;
   a drive coil and a fifth resistor, a first terminal of said drive coil being coupled to an output of said first operational amplifier, and a second terminal of said drive coil being coupled through said fifth resistor to said ground terminal;
   a voltage divider circuit comprising sixth and seventh resistors coupled in series between said output of said first operational amplifier and said ground terminal;
   a second operational amplifier and eighth through tenth resistors, an inverting input terminal of said second operational amplifier being coupled through said eighth resistor to a connection point of said sixth and seventh resistors, a noninverting input terminal of said second operational amplifier being coupled through said ninth resistor to a connection point of said drive coil and said fifth resistor and through said tenth resistor to said ground terminal;
   an eleventh resistor having a first terminal coupled to an output of said second operational amplifier;
   a twelfth resistor having a first terminal coupled to a second terminal of said eleventh resistor and a second terminal coupled to said noninverting input terminal of said first operational amplifier; and
   a second switch coupled in parallel with said twelfth resistor, said first and second switches being ganged together.

9. The video camera iris control circuit of claim 8, further comprising a thirteenth resistor coupled between said output of said first operational amplifier and said inverting input terminal of said first operational amplifier, and a fourteenth resistor coupled between said output of said second operational amplifier and said inverting input terminal of said second operational amplifier.

* * * * *